March 26, 1963 S. E. TOLIVER 3,082,648
SPEED CHANGER
Filed Feb. 23, 1960 3 Sheets-Sheet 1

INVENTOR:
STANLEY E. TOLIVER
BY:
Green, McCallister & Miller
HIS ATTORNEYS.

March 26, 1963

S. E. TOLIVER 3,082,648

SPEED CHANGER

Filed Feb. 23, 1960

March 26, 1963　　　　　S. E. TOLIVER　　　　　3,082,648
SPEED CHANGER
Filed Feb. 23, 1960　　　　　　　　　　　　　　　3 Sheets-Sheet 3
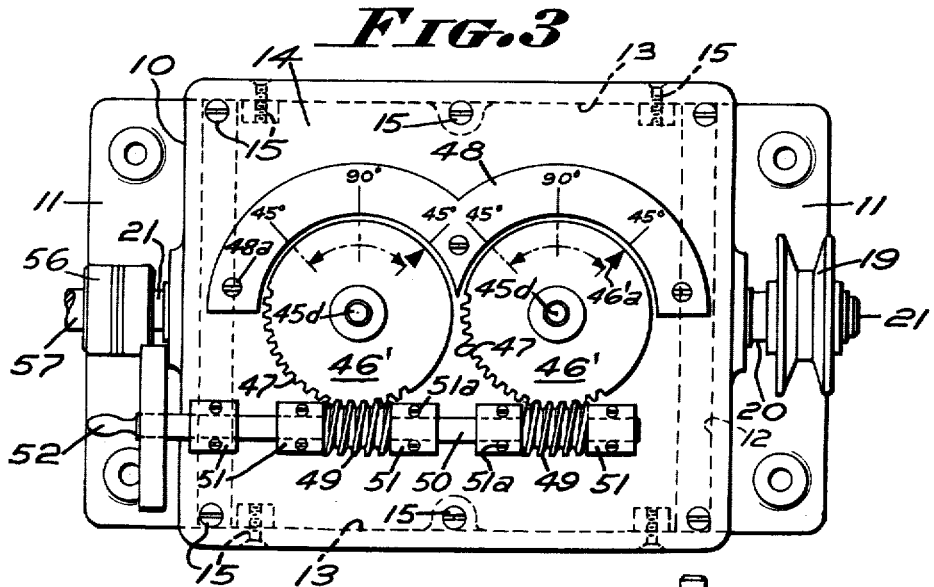
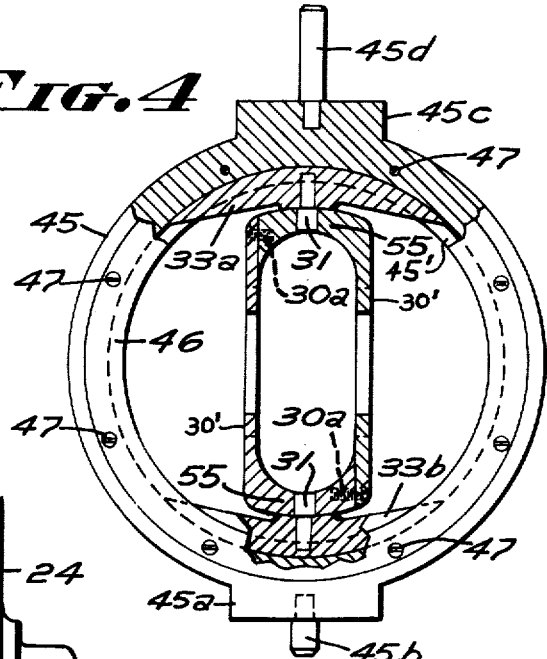
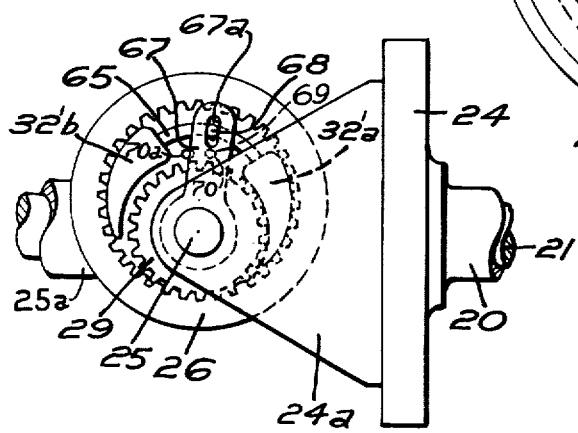
INVENTOR.
STANLEY E. TOLIVER
BY:
*Green, McCallister & Miller*
HIS ATTORNEYS.

United States Patent Office 3,082,648
Patented Mar. 26, 1963

3,082,648
SPEED CHANGER
Stanley E. Toliver, 197 Shetland Ave.,
Pittsburgh 6, Pa.
Filed Feb. 23, 1960, Ser. No. 10,139
15 Claims. (Cl. 74—793)

This invention relates to a speed changing device, and more particularly, to an adjustable speed changer wherein the speed ratio between the rotation of input and output shafts is variable and may be pre-selected.

Known types of variable speed changers presently utilized are responsive to variations in the relationship between the torque and load on the shafts. Such speed changers have limited application, and their ratio of change cannot be pre-set or manually altered as desired. In addition, other known types of variable speed changers require a discontinuous drive mechanism which necessitates clutches and other means of engaging and disengaging the input and output shafts.

My improved speed changer incorporates an input shaft which is in a constant meshed connection with the output shaft. Even though the speed ratio between the input and output shafts may be manually changed while the device is in operation, my improved speed changer does not require the use of clutches or other means for disengaging the input and output shafts from one another. In fact, the input and output shafts are in a constant meshed connection even when the speed ratio is varied from one pre-determined setting to another.

It thus has been an object of my invention to provide an improved speed changer having a positive drive constantly maintained between the input and output shafts.

A further object of my invention has been to provide a variable speed changer wherein the speed ratios between the input and output shafts may be varied without disengaging the motive drive between the input and output shafts.

A further object of my invention has been to provide an improved speed changer having a constantly meshed drive connection between the input and output shafts wherein the speed ratios therebetween may be pre-set at a pre-determined desired ratio.

These and other objects of my invention will become apparent to those skilled in the art from the following disclosure and accompanying drawings in which:

FIGURE 3 is a top plan view of the speed changer of FIGURES 1 and 2, but on a reduced scale as to both FIGURES;

FIGURE 4 is a detail view in elevation and partial section of a portion of the operating mechanism of the speed changer of and on the scale of FIGURE 1; and, FIGURE 5 is a side elevation on the scale of FIGURE 2 illustrating a further embodiment of gear mechanism that may be utilized in a speed changer constructed in accordance with my invention.

Figure 1:
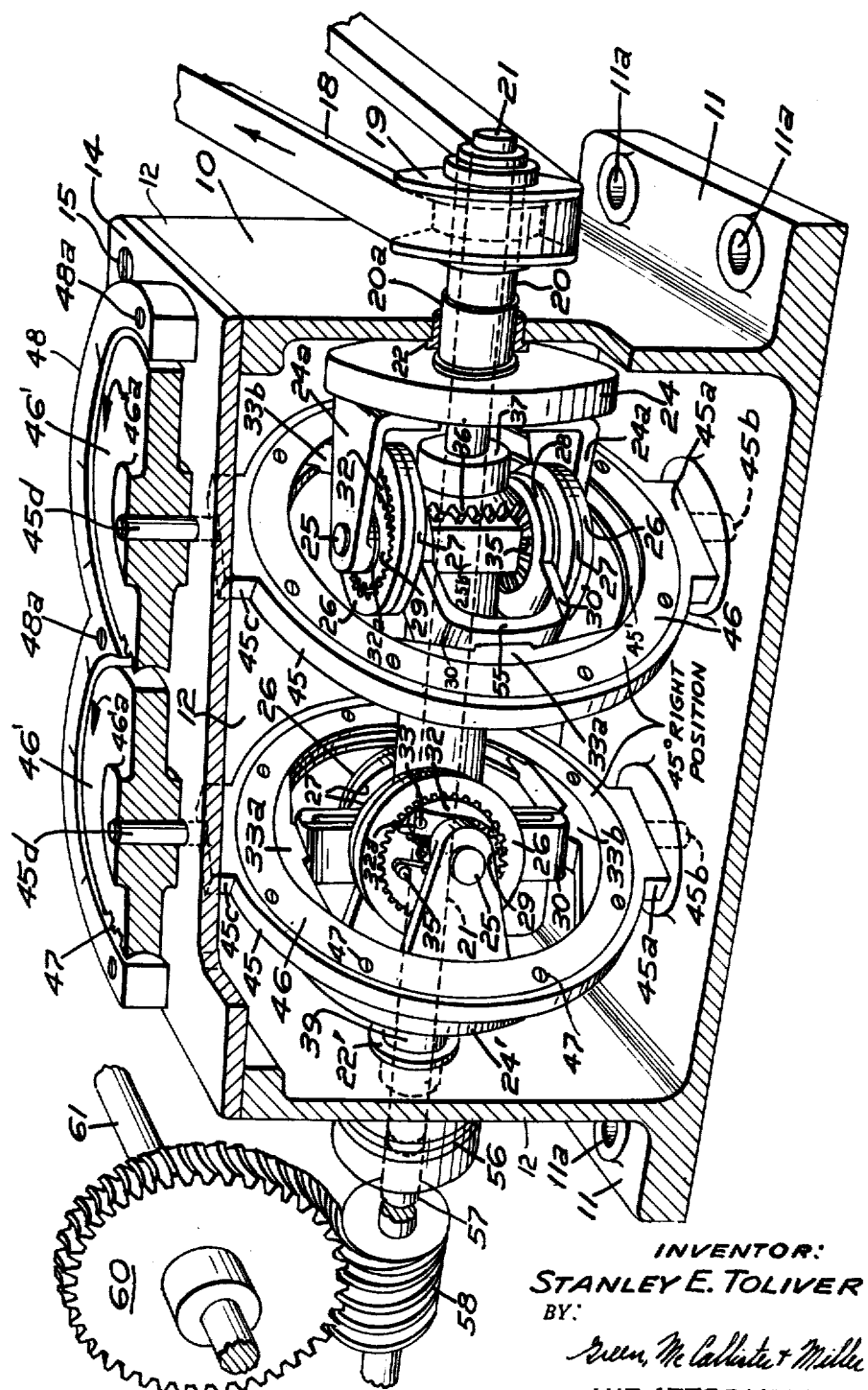
FIGURE 1 is a perspective view in elevation, partially in section, illustrating an embodiment of my improved speed changer.
Figure 2:
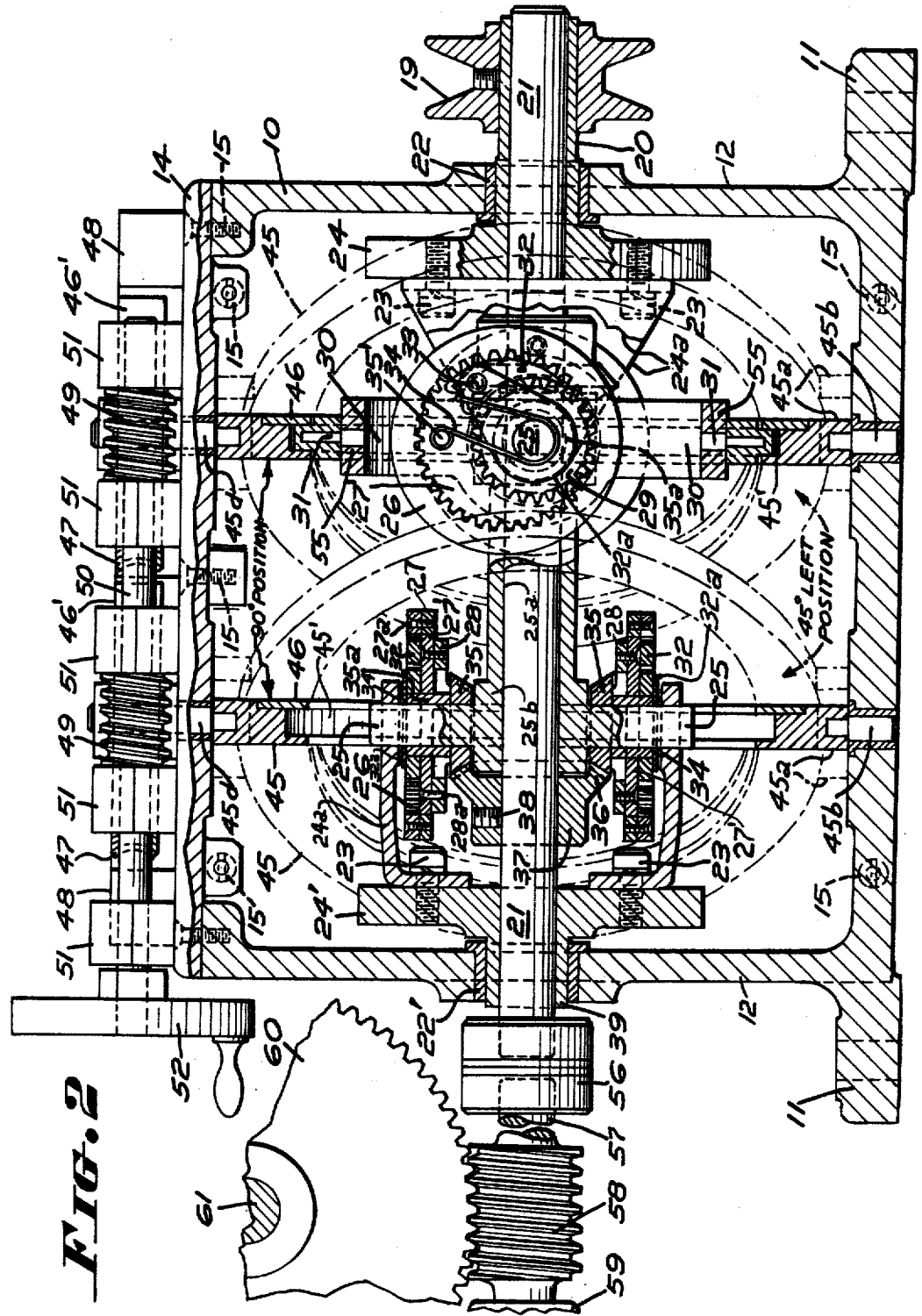
FIGURE 2 is a slightly enlarged side elevational view in section of the speed changer shown in FIGURE 1, taken along a common axis of the input and output shafts.

Referring now to the drawings, and particularly FIGURES 1 and 2, a housing or supporting means 10 for the speed changer device has an integral bottom closure plate or wall provided with a pair of base flanges 11 having hold-down bolt holes 11a. The housing also has integral opposed end plates or walls 12 and opposed side plates 13 and a top plate 14. The plates 13 and 14 may be removably secured to the housing by screws 15.

A pulley 19 may be secured to a hollow or sleeve-like input or drive shaft member 20 in any suitable manner, such as a spline, key or set screw. A V-belt 18 may be connected to a motive source or motor (not shown) to provide motive power for the pulley 19 and accordingly drive the input shaft 20. An output or driven shaft member 21 is journaled to extend, at one end, concentrically within the input shaft 20 for relative rotation with respect thereto. The input or drive shaft 20 has an enlarged bearing portion 20a journaled for rotation within sleeve bearings 22 carried by an end wall 12 of the housing 10.

A disc or yoke 24 is splined on or formed integral with an inner end of the drive shaft 20 for rotation in unison therewith. A pair of opposed bifurcated arms 24a are secured at one end to an inner face of the yoke disc 24 (see FIGURE 2) by screws or bolts 23. An additional yoke disc 24' may be journaled for rotation about the output shaft 21 and within bearings 22' carried by an opposite end wall 12. The yoke disc 24' may also have a pair of opposed arms 24a extending outwardly therefrom. A sleeve 25a (see FIGURE 2) having opposed bossed end portions 25b (see FIGURES 1 and 2) is rotatably mounted on an intermediate or central axial portion of the output or driven shaft 21. A pair of opposed or transversely-positioned, cross pin shafts 25 extend radially-outwardly from each bossed end 25b of the sleeve 25a and are secured within the extending ends of an adjacent pair of yoke arms 24a.

Although, as shown in FIGURES 1 and 2, a gear mechanism assembly is provided on the pair of pin shafts 25 at each bossed end 25b of the sleeve 25a, a detailed description of the gear mechanism at only one end will be described, since the mechanisms at the ends of the shaft 25a are identical. Further, since the gear mechanism mounted on one pin shaft 25 is identical to the gear mechanism on its opposed shaft 25, a description of the gear mechanism on only one shaft 25 will be described in detail, since it will suffice for the gear mechanisms on all of the pin shafts 25.

A back spacer plate or disc 27' is eccentrically and oscillatably mounted about the pin shaft 25 between a yoke arm 24a and a bossed end 25b, and supports an outer spacer ring 27. An internal spur or ring gear 26, secured to the outer spacer ring 27, such as by rivet pins or screws 27a (see FIGURE 2), is mounted for rotation in an eccentric relationship about the pin shaft 25. The disc 27' supports the outer spacer ring 27 and the ring gear 26 for relative rotational movement with respect to both itself and the pin 25. As shown in FIGURES 1 and 4, an oscillatable O-shaped bracket 30, having a pair of U-shaped cross extension or end portions 55, has a pair of side arm portions 30' which have (see FIGURES 1 and 2) a central ring or disc portion 28 pivotally mounted about the pin shaft 25 and secured to a back or inner surface of the back spacer disc 27' by screws or rivet pins 28a. As shown in FIGURE 4, the bracket may be of partible construction having its two complementary parts secured together by screws 30a.

A beveled pinion 35, having an integral sleeve shaft 35a journaled on the pin shaft 25, is rotatably positioned between the boss 25b and the back surface of the opposed backing disc 27'. The backing disc 27' is journaled about the pin shaft 25 for relative rotation on the sleeve 35a. An inner pinion ring 29 is concentrically mounted about pin shaft 25 on the sleeve 35a for unified rotation with the beveled pinion 35. The pinion 29 is positioned in abutment with back spacer disc 27' to cooperate with eccentrically mounted ring gear 26.

An outer spacer washer or member 32a is pivotally mounted about the pin shaft 25 between the pinion 29 and the aforementioned bifurcated arm 24a. A cam shoe 32 is pivotally mounted on a pin 33 and secured to the washer member 32a to maintain a portion of the teeth of the pinion 29 in rotational engagement with the eccentrically mounted outer ring gear 26 and facilitate rotational movement therebetween during periodic intervals when the shoe 32 is wedgedly urged therebetween, in one direction, and to lock the pinion gear 29 and the ring gear 26 together so that they rotate about the pin shaft 25 in unison, when the shoes are urged therebetween in an opposite direction. The washer member 32a positions the cam shoe 32 between ring gear 26 and pinion 29. A position-retention, tension spring 34 is secured at one end over a pin 35' that is attached to the back spacer disc or plate 27'. The spring 34 passes about the pin shaft 25 and at its other end engages or is secured to the cam shoe 32. When the backing disc 27' and accordingly, the pin 35' are rotated toward the shoe 32, as more fully described hereinafter, the spring 34 will urge the shoe 32 into a wedging reltionship between the ring gear 26 and the pinion 29 to facilitate a rotational movement between the gears.

For the sake of simplicity, the foregoing description of the gear mechanism has been set forth with regard to that provided on only one pin shaft 25. It is to be understood, however, that the gear mechanism assembly at each end of the sleeve 25a will have an opposed pair of such gear mechanisms, since each end of the sleeve 25a is provided with a pair of opposed pin shafts 25. In addition to the pair of gear mechanisms, each gear assembly at the opposite ends of sleeve 25a is also provided with the elements hereinafter described, although set forth with regard to only one such assembly.

A pinion gear 36, carried by a collar 37, is mounted on the output or driven shaft 21 adjacent a bossed end 25b of the sleeve 25a and secured to the output shaft by a key or set screw 38. The pinion gear 36 operatively engages the transverse pair of beveled pinions 35, which are rotatably mounted on opposed pin shafts 25. It thus can be seen that the rotation of either of the beveled pinions 35, about the axis of the pin shafts 25, will impart a rotational movement to the adjacent pinion gear 36 which, in turn, imparts rotation to the driven shaft 21.

A pair of pivot pins 31 are secured to and extend outwardly from opposite ends of the O-shaped bracket 30 (FIGURES 2 and 4). The pivot pins 31, at the opposite ends of the bracket 30, are pivotally mounted in a pair of sliding guides or shoes 33a and 33b to permit the bracket 30 to be pivoted or rotated with respect thereto. The slide guides 33a and 33b are slidable within a circular ring guideway 45' formed in a ring-shaped assembly 45. The assembly 45 has a removable front flange portion 46 that is secured to an integral back flange portion by screws 47, and defines the guideway, inner trough or circular groove 45' therein.

The ring assembly 45 has an integral rectangular or flat, bottom-positioning portion 45a that carries a pivot pin 45b, and an integral flat, upper, rectangular-mounting portion 45c that carries a pivot pin 45d. The lower pivot pin 45b is pivotally mounted within a boss portion formed on the bottom of the casing 10, whereas the upper pivot pin 45d is journaled for rotation within a bore formed through the top cover 14. An indicating wheel or disc 46' is secured to the pin 45d (see FIGURES 1 and 3). The disc 46' is provided with a dial or arrow indicator 46'a to indicate the relative position of the ring assembly 45 within the housing 10.

Although only one gear mechanism assembly, mounted on the pin shafts 25 at one end of the sleeve 25a and rotatable within a ring assembly 45, has been described, it is apparent from the drawings that an identical gear mechanism assembly is also provided on pin shafts 25 at the opposite end of the sleeve 25a and is rotatable within a second pivotally mounted ring assembly 45. As shown in the drawings, however, the axially-aligned and diametrically opposed transverse pins 25 extending from one end of the sleeve 25a are positioned perpendicular to or 90 degrees out of phase with the diametrically-opposed and axially-aligned pins 25 at the opposite end of the sleeve 25a. With this end exception, the two gear mechanisms at the right and left-hand end of the sleeve 25a are identical.

A sleeve 39 of the left-hand yoke 24' is rotatably mounted within bearing 22' which is carried by the housing 10. The output shaft 21 is journaled for rotation within the sleeve 39. The left-hand yoke 24', however, functions merely as an idler and not as an input or drive shaft, as does the right-hand yoke 24, which is formed integral with the input shaft 20. It is therefore possible to omit the left-hand yoke 24' and its arms 24a, if desired, and retain the gear mechanisms on these pins 25 by any suitable means such as cotter pins. The output shaft 21 would then be journaled directly within suitable bearings carried by the housing.

A position-indicating member 48, having two semi-circular graduated halves, is shown securely positioned on the top cover 14 adjacent the two indicating wheels or discs 46' by screws 48a. As shown in FIGURE 3, each of the indicating wheels 46' has gear teeth along substantially half of its periphery. A worm gear 49 is positioned to mesh with the gear teeth 47 of each wheel 46'. Both of the worm gears 49 are carried by a rotatable shaft 50 which is mounted in bearing mounts 51 that are secured by screws 51a to the cover plate 14 of the casing 10. A turn crank 52 is secured on one end of the rotatable shaft 50 to simultaneously turn both of the worm gears 49 and thereby rotatably adjust the discs 46' and accordingly, the pivot pins 45d and ring assemblies 45 in synchronism.

The output shaft 21 (see FIGURE 2) may have a coupling 56 secured on its end opposite the input shaft. A second driven shaft 57 having a suitable take-off, such as worm gear 58, is shown connected to the driven shaft 21 by the coupling 56. A gear wheel 60 meshes with and is activated by the worm gear 58 to rotate a power take-off tertiary shaft 61, at a desired positive speed which may be pre-determined by the setting of the speed changer.

In the operation of the devices disclosed in FIGURES 1 through 4, a rotation of the input shaft 20 in a clockwise direction, as indicated by the arrow in FIGURE 1, will produce a clockwise rotation of the output shaft 21. When the ring assemblies 45 are set in their 90 degree position shown in FIGURE 2, there will be a direct drive between the input and output shafts, with the output shaft rotating at the same speed as the input shaft. As the input shaft 20 is rotated, with the ring assemblies in their 90 degree position, its yoke 24 and arms 24a will rotate the pins 25 about the axis of the input shaft. Accordingly, the beveled pinions 35 that are mounted on the pin shafts 25 will be rotated about the axis of the input shaft 20 at the same speed of rotation as the input shaft, although they will not be rotated about the axis of the pins 25. As a result, the teeth of the opposed pair of beveled pinions 35 which engage the pinion gear 36 that is mounted on output shaft 21, cause the pinion gear and accordingly the output shaft to rotate at the same speed that the input shaft 20 directly imparts to the pins 25 on which the pinions 35 are mounted, and accordingly the input and output shafts will rotate at the same speed.

However, when the ring assemblies 45 are set at any position other than the 90 degree position, the output shaft 21 will rotate at a different speed from the rotation imparted to the input shaft 20. With the ring assemblies 45 set in any position other than their 90 degree positioning, such as the right-hand position of FIGURE 1, or a left-hand position shown in chain lines in FIGURE 2, and with the input shaft 20 rotated in a clockwise direction (when viewing the device from the right-hand end of FIGURES 1 and 2), shown by the arrow on the belt 18 of FIGURE 1, the output shaft 21 will rotate at a greater speed than the input shaft 20. The amount of change in the speed of rotation of the output shaft 21 over the input shaft 20 is determined by the amount of angular deflection of the ring assemblies 45 from their 90 degree positioning. That is to say, as the amount of angular deflection of the ring assembly 45 is increased, either in the right-hand of left-hand position from the 90 degree positioning, the amount, degree, or amplitude of oscillation imparted to the oscillatable member 30 will be increased, and accordingly the variance in the ratio between the speeds of the input and output shafts will be increased.

As input shaft 20 is rotated in a clockwise direction as before-mentioned, the arms 24a of the right-hand yoke 24 rotate the pins 25 secured to the sleeve 25a about the common axis of the input and output shafts at the same rate of speed of rotation as the input shaft. Since the sleeve 25a is rotatably mounted on the output shaft 21, and since the pins 25 at the left-hand end of the shaft 25a are rigidly secured thereto, they also will rotate at the same speed as the input shaft 20. As the pins 25 rotate about the common axis of the input and output shafts, 20 and 21, the closed, O-shaped bracket 30 is accordingly rotated about the same common axis. However, since the sliding guides 33a and 33b must follow the guideway 45' of the pivoted ring assembly 45, the O-shaped bracket 30 will not only be rotated about the common axis of the input and output shafts, but will also be oscillated back and forth about the axis of the pins 25 as the pins are rotated about the common axis.

Since the ring portion 28 of the bracket 30 is secured to the back plate 27', which is rotatably positioned within the backing ring 27, the back plate 27' will be rotated or oscillated with the bracket 30. When the plate 27' is rotated so that the pin 35', secured thereto, is urged away from the shoe 32, the eccentric plate 27' wedges the shoe 32 between the pinion 29 and ring gear 26 and locks them together so that they rotate in unison about the pin shaft 25 with the ring portion 28. At this time, however, the pin 35', secured to the backing plate or disc 27' on the opposite pin shaft 25, is rotated toward the shoe 32 and the tension spring 34 urges its shoe 32 between the pinion 29 and the ring gear 26 and thereby permits the pinion 29 to idly rotate with respect to the ring gear 26. Since the pinion 29 is securely mounted on the sleeve 35a of beveled pinion 35, a rotation of the locked pinion 29 will cause a simultaneous rotation of beveled pinion 35. The rotation of pinion 35 about the axis of the pin 25 will accordingly impart rotation to the pinion gear 36 (that is secured to the output shaft 21), in a clockwise direction. Since the revolution of the beveled pinion 35 by the drive shaft about the common axis of the input and output shafts, rotates the output shaft at the same speed as the input shaft, the rotation of the beveled pinion 35 about the pin 25 further rotates the pinion gear 36, as aforementioned, to add to the speed of the output shaft and thereby increase its speed of rotation over that of the input shaft.

As the O-shaped bracket 30 is oscillated back and forth about the pins 25 by the pivoted ring assembly 45, each end of the O-shaped bracket 30 obtains a maximum deflection on one side of the pins 25, is returned to a central position within a vertical plane passing through the axis of the pins 25, and is then deflected to a maximum position on the opposite side of the pins, with the cycle being continually repeated with the rotation of the input shaft. When in its maximum deflection, the O-shaped bracket 30 lies within a vertical plane which passes through the axis of the pins 25 and lies within the guideway 45'.

At the point of outermost deflection, the bracket 30 does not impart any rotational movement to the beveled pinions 35, since, when in this position, neither of the shoes 32 is wedgedly urged in a locking relationship between the gears 26 and 29. However, after this zero point is passed, the bracket 30 is again urged toward its center position with respect to the pins 25, and accordingly, the plate 27' on one side of the bracket 30 is rotated to wedgably lock a shoe 32 between a pinion 29 and ring gear 26, causing the pinion 29 to rotate in unison with the adjacent ring gear 26 about the pin shaft 25. At this time, the pin 35' on the opposite side of the bracket 30 is urged toward its shoe 32 and accordingly, facilitates an idling rotation between the pinion 29 and ring gear 26 on that side of the bracket.

In order to provide a uniform or constant speed rotation of the output shaft 21, the pins 25 at one end of the sleeve 25a are positioned perpendicular to or 90 degrees out of phase with the pins at the opposite end of the sleeve. Accordingly, when the bracket 30 on one end of the sleeve is in its zero load position within the vertical plane which extends through the guideway 45' and the axis of the pins 25, the bracket 30 at the opposite end of the sleeve 25a will be in its maximum change or load position, thus imparting a constant speed ratio to the output shaft 21 at each pre-determined setting of the pivotable ring assemblies 45. In other words, the gear mechanism assemblies at the opposite ends of the sleeve 25a provide an overlapping drive, impart uniform rotation to the output shaft 21, and eliminate a pulsating drive to the output shaft 21 which may otherwise be occasioned if the sleeve 25a were provided with only one such gear mechanism assembly.

FIGURE 5 illustrates a further embodiment of a shoe device which may be utilized with my speed changer to permit the input shaft to transmit a positive drive to the output shaft when the input shaft is rotated in either a clockwise or counter clockwise direction. A pair of shoes 32'a and 32'b are mounted between each pinion 29 and ring gear 26. Shoe 32'a is similar to shoe 32 disclosed in FIGURES 1 and 2, and urges the pinion 29 into locking engagement with one side portion of the ring gear 26 when the input shaft 20 is rotated in the aforementioned clockwise direction. The opposed shoe 32'b is designed to urge the pinion 29 into locking engagement with an opposite side portion of the ring gear 26 when the input shaft 20 is driven in a counter-clockwise direction.

The shoes 32'a and 32'b are shown connected together by an arcuate connecting rod 65. A control member 67, having a slot 67a in its arm portion, is pivotally mounted about the pin shaft 25 between pinion 29 and an adjacent arm 24a. A pin 68, projecting from the arcuate connecting rod 65, is positioned within the slot 67a of the control member 67. A spring-tensioned detent 69 is carried by the arm portion of the control member 67, and is adapted to engage and be positioned in holes or recesses 70 or 70a that are formed in an outer surface of the adjacent backing plate 27'.

The control member 67 is adapted to be rotated about an arcuate portion of the shaft pin 25, so that the detent pin 69 may be positioned within either hole 70 or 70a. When the control member 67 is positioned with the detent 69 retained within the recess 70, the shoe 32'a will be moved to an operable position between the pinion 26 and ring gear 29, so that the drive shaft 20 may transmit positive power to the output shaft 21 when rotated in a clockwise direction. When the control member 67 is positioned with the detent 69 projecting within hole 70a, the shoe 32'a will be removed from its operable position, and the opposite shoe 32'b will be rotated into an operable position between the pinion 29 and ring gear 26, so that when rotated in a counter clockwise direction, the drive shaft 20 may transmit positive power to the output shaft 21.

The operation of the speed changer in a counter clockwise direction is identical to that previously described with regard to its clockwise rotation. When a shift in the direction of rotation is desired, the operator need only to reverse the position of the control members 67. A reverse rotation of the input shaft 20 will then produce a positive rotation of the driven shaft 21 in the reverse direction.

The amount of increase which may be obtained with my improved speed changer is, of course, dependent upon the relative gear ratios and diameters in the intermeshing gears, and may be varied in construction, as desired. Utilizing a two to one gear ratio between the beveled gears 35 and the pinion gear 36, and a diameter ratio of approximately four to three between the ring gear 26 and pinion 29, I have achieved up to a 25% increase on the output shaft over the input shaft, while utilizing only one ring assembly 45.

Although, I have disclosed preferred embodiments of my invention, it will be apparent to those skilled in the art that various changes and modifications may be made therein without departing from the spirit and scope of the invention as encompassed in the following claims.

What I claim is:

1. An improved speed changer comprising a housing body, a pair of coaxially mounted input and output shafts journaled for rotation in opposed side walls of said housing body, a sleeve journaled for rotation on said output shaft, a pair of axially-aligned and diametrically opposed pin shafts extending radially-outwardly from said sleeve adjacent each end thereof, identical gear means mounted on each of said pin shafts, second gear means mounted on said output shaft for unified rotation therewith adjacent each end of said sleeve and in cooperable meshing relationship with said identical gear means, yoke means connecting said input shaft and said sleeve for imparting a direct drive from said input shaft to said sleeve, a ring assembly pivotally mounted about an axis lying in a plane which is normal to the common axis of said coaxial input and output shafts and which passes through the axis of a pair of opposed pin shafts, a circular guideway formed in an inner face of said ring assembly, oscillatable bracket means pivotally mounted about each pair of opposed pin shafts and operatively connected to said identical gear means to rotate said identical gear means about the axis of said pin shafts and accordingly rotate said second gear means and said output shaft at a rate variable from the rate of rotation of said input shaft, said bracket means being pivotally mounted at its opposite ends in a pair of slide guides which are positioned for slidable rotation within said guideway, and means for positioning said ring assembly about its pivotal axis to adjust the amount of deflection imparted to said oscillatable bracket means and accordingly the amount of variance in the rate of rotation between said output shaft and said input shaft.

2. An improved speed changer comprising, concentrically mounted input and output shafts, a sleeve journaled for rotation on said output shaft, opposed pin shafts extending radially outwardly from said sleeve adjacent each end thereof, yoke means connecting said drive shaft to one end of said sleeve to impart a direct drive from said drive shaft to said sleeve, first gear means secured to said output shaft for unified rotation therewith adjacent each end of said sleeve, second gear means mounted on said pin shafts in cooperable meshing relationship with said first gear means to impart a rotation to said output shaft upon rotation of said sleeve by said input shaft, oscillatable means pivotally mounted about said pin shafts and cooperable with said second gear means to impart rotation to said second gear means about said pin shafts and supply an increased rate of rotation to said first gear means over that supplied by the rotation of said input shaft, ring guide means circumscribing the common axis of said concentric input and output shafts and pivotable about an axis normal to said common axis, a circular guideway formed in an inner surface of said guide means, a pair of slide guides slidably positioned within said guideway, said oscillatable means pivotally secured at its opposite ends to said slide guides, said slide guides being slidable about said circular guideway when said oscillatable means is rotated about the axis of the concentric input and output shafts to oscillate said oscillatable means back and forth about the axis of said pin shafts and actuate said second gear means to impart an increased rotation to said first gear means and said output shaft, and means for adjusting the relative position of said pivotable guide means to select the degree of oscillation imparted to the oscillatable means and accordingly the amount of increase in the rate of rotation imparted to said output shaft over said input shaft.

3. In a speed changer having an input and output shaft, means for varying the relative rate of rotation of the output shaft with respect to the rotation of the input shaft, said means comprising a sleeve rotatably journaled on said output shaft, a direct drive connection between said input shaft and said sleeve to rotate said sleeve in unison with said input shaft, diametrically opposed pin shafts extending radially-outwardly from said sleeve adjacent each end thereof, pinion gear means secured on said output shaft for unified rotation therewith adjacent each end of said sleeve, gear means mounted on said pin shafts in intermeshing relationship with said pinion gear means for imparting rotation thereto, oscillatable means pivotally mounted about said pin shafts and secured to said gear means to actuate said gear means and rotate said pinion gear means at a rate variable from the rate of rotation of the input shaft, pivotable ring guide means for imparting oscillatable movement to said oscillatable means as said oscillatable means is rotated by said sleeve about the axis of said output shaft, and means for manually controlling the position of said pivotable guide means for selecting the amount of oscillation imparted to the oscillatable means and accordingly the amount of variance of rate of rotation between the output shaft and the input shaft to thereby pre-select a desired speed of rotation delivered by the output shaft.

4. A device having an input and output shaft for varying the speed of rotation of the output shaft while maintaining the speed of rotation of the input shaft constant, said input and output shafts being maintained in a constant mesh connecting relationship while the rate of rotation of the output shaft is varied with respect to the constant rate of rotation of the input shaft, said output shaft being concentrically mounted with respect to said input shaft and being journaled for rotation at one end within said input shaft, a sleeve journaled for rotation on said output shaft, a pair of opposed pin shafts extending radially-outwardly from said sleeve adjacent each end thereof, first gear means mounted on said output shaft for uniform rotation therewith adjacent each end of said sleeve, second gear means rotatably mounted about said pin shafts in meshing relationship with said first gear means to impart rotation to said first gear means and accordingly said output shaft, yoke means connecting said input shaft to said sleeve forming a direct drive therebetween, oscillatable means connected to said second gear means and pivotally mounted about said pin shafts to impart rotation to said second gear means and accordingly said first gear means at a rate variable from the constant rate of rotation of said input shaft and dependent upon the degree of oscillation imparted to the oscillatable means, ring guide means circumscribing each end of said sleeve and pivotally mounted about an axis transverse to the axis of said sleeve for imparting oscillating movement to said oscillatable means about the axis of the pin shafts as the oscillatable means is rotated about the axis of said sleeve, said pivotable guide means having a circular guideway formed in an inner periphery thereof, a pair of slide guides pivotally mounted on opposite ends of said oscillatable means and slidable within said guideway, and means for pre-selecting the position of said guide means to select the degree of oscillation imparted to said oscillatable means and accordingly the amount of variance in the rate of rotation of the output shaft with respect to that of the input shaft.

5. An improved speed changer comprising an input shaft, an output shaft, a sleeve journaled for rotation on said output shaft, a pair of opposed pin shafts extending radially-outwardly from said sleeve adjacent opposite end portions thereof, direct drive means connecting said input shaft to said sleeve for rotating said sleeve in unison with said input shaft, pinion gear means mounted on said output shaft for unified rotation therewith adjacent each end of said sleeve, gear means mounted on said pin shafts and meshingly engaging said pinion gear means to rotate said pinion gear means and accordingly said output shafts upon rotation of said input shaft, oscillatable means pivotally mounted about said pin shafts and connected to said gear means for rotating said gear means and imparting a further rotation to said pinion gear means and accordingly said output shaft, said gear means comprising a beveled pinion mounted on each of said pin shafts and engaging said pinion gear means, each said beveled pinion having a collar extending along its pin shaft, a backing disc pivotally and eccentrically mounted about each collar adjacent the beveled pinion, a spacer ring circumscribing each of said backing discs and being rotatable relative thereto, an internal spur gear secured to each of said backing discs, a pinion gear concentrically mounted on each collar for rotation therewith and for meshing engagement with said internal spur gear, shoe means positioned between each said internal spur gear and its adjacent pinion gear for intermittently permitting and prohibiting relative rotational movement between said gears, oscillatable means pivotally and concentrically mounted about each pair of said pin shafts and secured to said backing discs, pivotally adjustable ring guide means circumscribing end portions of said sleeve for imparting a pre-determined degree of oscillation to said oscillatable means about said pin shafts as said oscillatable means is rotated about the axis of said sleeve, and said oscillatable means periodically rotating each said backing disc to wedge one of said shoe means between an adjacent pinion gear and internal spur gear to lock said gears together so that the pinion gear will rotate with said backing disc and accordingly rotate said beveled gear to impart further rotation to said pinion gear means and said output shaft to vary the speed of rotation of said output shaft with regard to a constant speed of rotation supplied by said input shaft.

6. An improved speed changer as defined in claim 5 wherein said shoe means comprises a retaining member mounted about each pin shaft adjacent its pinion gear, a wedge-shaped shoe member pivotally mounted on said retainer member between said internal spur gear and said pinion gear, a pin projecting outwardly from each of said backing discs, and tension spring means extending between each of said pins and one of said wedge-shaped members to urge the wedge-shaped member between the pinion gear and the internal spur gear when said backing disc is rotated toward said wedge-shaped member by said oscillating member.

7. An improved speed changer as defined in claim 5 wherein said shoe means comprises a control member pivotally mounted about each of said pin shafts, a slot formed in an arm of said control members, an arcuate connecting rod for each control member, a pair of wedge-shaped shoe members secured to the ends of each said rod and positioned between adjacent internal spur gears and pinion gears, a pin extending outwardly from each said rod and through one of said slots, detent means formed in the arm of each said control member for adjustably setting the arcuate position of said wedge-shaped members between their adjacent internal spur gear and pinion gear.

8. An improved speed changer as defined in claim 5 wherein said pivotally adjustable ring guide means comprises a ring assembly for each end of said sleeve pivotable about an axis lying in a plane which is normal to the axis of said sleeve and contains the axis of a pair of said pin shafts, said ring assembly having a circular guideway formed in an internal peripheral surface thereof, a pair of slide guides slidable within said circular guideway and pivotally mounted on opposite ends of said oscillatable means; and means are provided for adjusting the arcuate positioning of said ring assembly with respect to the axis of said sleeve to adjustably set the degree of deflection imparted to said oscillatable means and accordingly the amount of variance in the speed of rotation imparted to said output shaft from the rotation imparted by the input shaft.

9. In a speed changer wherein input and output shafts are concentrically mounted above a common axis for relative rotation and gear means mounted on said output shaft coaxially of said common axis are in constant mesh with gear means carried by said input shaft normal to said common axis to impart the same rate of rotation to said output shaft as is supplied by said input shaft, means for rotating the normally aligned gear means to vary the speed of rotation of said output shaft with respect to the speed of rotation of said input shaft while maintaining the shafts in constant meshed relationship comprising, a sleeve rotatably mounted on said output shaft intermediate said axially-aligned gear means, a pair of opposed pin shafts extending radially-outwardly from each end of said sleeve and normal to the common axis of said concentrically mounted shafts; said normally aligned gear means being mounted on said pin shafts and comprising, beveled pinion means concentrically mounted about said pin shafts and engaging said axially-aligned gear means mounted on said output shaft, pivotable backing disc means eccentrically mounted about said pin shafts, internal spur gear means mounted concentrically about said eccentrically mounted backing disc means, pinion means mounted concentrically about said pin shafts for uniform rotation with said beveled pinion means, oscillatable means concentrically mounted about said pin shafts and secured to said backing disc means to periodically pivot said backing disc means, and means responsive to the pivotal movement of said backing disc means for rotating said pinion means with said internal spur gear means about the axis of said pin shafts to rotate said beveled pinion means and said axially-aligned means secured to said output shaft, and adjustable ring assembly means for imparting a pre-determined degree of deflection to said oscillatable means for controlling the rate of rotation of said output shaft with respect to said input shaft.

10. In a speed changer having concentrically mounted input and output shafts journaled for rotation about a common axis and wherein the output shaft has axially-aligned gear means secured thereto for rotation therewith about said common axis and in constant mesh with gear means carried by said input shaft on an axis normal to said common axis for rotating said output shaft at the same speed of rotation as the rotation of said input shaft, means for rotating said normally aligned gear means about their axis normal to said common axis to vary the speed of rotation of said output shaft with respect to said input shaft comprising, a sleeve rotatably mounted on said output shaft, a pair of diametrically-opposed pin shafts extending radially-outwardly from each end of said sleeve normal to said common axis of said concentric input and output shafts and adjacent the axially-aligned gear means mounted on said output shaft; said normally aligned gear means being mounted on said pin shafts and comprising, beveled pinion gear means concentrically-mounted on said pin shafts in constant mesh with said axially-aligned gear means, backing disc means pivotally mounted eccentrically about said pin shafts adjacent said beveled gear means, internal ring gear means mounted eccentrically about said pin shaft adjacent the periphery of said eccentrically-mounted backing disc means, pinion means mounted concentrically about said pin shafts for uniform rotation with said beveled pinion gear means and in intermeshing relationship with said internal ring gear means, oscillatable means concentrically mounted about said pin shafts and secured to said backing disc means to periodically pivot said backing disc means, shoe means responsive to the pivotal movement imparted to the backing disc means by said oscillatable means to lock said pinion means and said internal ring gear means together, said oscillatable means rotating said locked pinion and gear means about the pin shafts to rotate said beveled pinion gear means which in turn rotates said axially-aligned gear means and said output shaft at a speed which is variant to that rotation imparted by the input shaft, and variably positionable ring guide means for controlling the amount of deflection imparted to said oscillatable means to control the degree of variance imparted to the output shaft by the rotation of the normally aligned gear means about the pin shafts.

11. An improved speed changer comprising an input shaft, an output shaft, a sleeve rotatable on said output shaft, means for rotating said sleeve in unison with said input shaft, first gear means on said output shaft, second gear means carried by said sleeve adjacent each end thereof for rotation about an axis normal to the axis of said input shaft and engageable with said first gear means, said second gear means at one end of said sleeve being rotatable about an axis which intersects a plane containing the axis of said output shaft and the axis of the second gear means at the opposite end of said sleeve, and means drivingly connected to said second gear means for varying the relative rotation between said input and output shafts while they are maintained in a constantly meshed connection.

12. An improved speed changer comprising concentrically-mounted input and output shafts, a sleeve mounted on said output shaft and rotatably driven by said input shaft, first gear means mounted on said output shaft for unified rotation therewith, second gear means carried by said sleeve normal to the common axis of said concentrically-mounted input and output shafts and in constant mesh with said first gear means, said normally mounted second gear means having identical portions carried by said sleeve which are axially spaced-apart and arcuately-offset, variable amplitude oscillating means for rotating said identical portions about axes normal to said common axis; and means for connecting said oscillating means to each of said identical portions in a cyclic manner such that as the cyclic impetus of one portion retards the cyclic impetus of another portion, further rotation will be produced to provide said output shaft with substantially uniform speeds of rotation which are variable with respect to the speed of rotation of said input shaft while maintaining the shafts in constant meshed relationship.

13. In a variable speed apparatus having an input shaft and an output shaft each having longitudinal axes, means for supporting said shafts for rotation about their axes, gear means securely connected to said output shaft for rotation in unison therewith, pin shaft means operatively connected to said input shaft for rotation in unison therewith, and second gear means rotatably mounted on said pin shaft means and positioned adjacent said first gear means in a constantly intermeshing relationship therewith; an improved means for driving and for varying the rate of rotation of said output shaft with respect to the rate of rotation of said input shaft comprising:

(A) a pinion gear securely connected to said second gear means for rotation about said pin shaft in unison therewith, (B) a spacer plate supported for oscillation about said pin shaft, (C) a ring gear rotatably supported on said spacer plate for rotation about an axis that is spaced from the axis of said pin shaft, said ring gear being in an intermeshing relationship with said pinion gear, (D) means for oscillating said spacer plate about said pin shaft, and (E) means for preventing relative rotation between said pinion gear and said ring gear during strokes of the oscillation in one direction and for permitting relative rotation therebetween during strokes in the other direction.

14. In variable gear ratio apparatus having an input shaft and an output shaft each having longitudinal axes, means for supporting said shafts for rotation about their axes, gear means securely connected to said output shaft for rotation in unison therewith, pin shaft means operatively connected to said input shaft for rotation in unison therewith, and second gear means rotatably mounted on said pin shaft means and positioned adjacent said first gear means in a constantly intermeshing relationship therewith; an improved means for driving and for varying the rate of rotation of said output shaft with respect to the rate of rotation of said input shaft comprising:

(A) a pinion gear securely connected to said second gear means for rotation about said pin shaft, in unison therewith, (B) a spacer plate supported for oscillation about said pin shaft, (C) a ring gear rotatably supported on said spacer plate means in an intermeshing relationship with said pinion gear to provide a spacing between said pinion gear and said ring gear on both sides of their mutual intermeshing region, (D) means for maintaining a fixed minimum dimension of spacing on one side of the mutual intermeshing region between said ring gear and said pinion gear, and (E) means driven in response to rotation of said input shaft for oscillating said spacer plate about said pin shaft.

15. In variable gear ratio apparatus having an input shaft and an output shaft each having longitudinal axes, means for supporting said shafts for rotation about their axes, gear means securely connected to said output shaft for rotation in unison therewith, pin shaft means operatively connected to said input shaft for rotation in unison therewith, and second gear means rotatably mounted on said pin shaft means and positioned adjacent said first gear means in a constantly intermeshing relationship therewith; an improved means for driving and for varying the rate of rotation of said output shaft with respect to the rate of rotation of said input shaft comprising:

(A) a pinion gear securely connected to the second gear means for rotation about said pin shaft in unison therewith, (B) a spacer plate supported for oscillation about said pin shaft, (C) a ring gear rotatably supported on said spacer plate means in an intermeshing relationship with said pinion gear to provide a spacing between said pinion gear and said ring gear on both sides of their mutual intermeshing region, (D) a cam shoe having an outer configuration that is generally similar to a portion of the spacing between said pinion gear and said ring gear, (E) means for resiliently positioning said cam shoe in the space on one side of the mutual intermeshing region and urging it into close engagement with said pinion and ring gears, (F) means driven in response to rotation of said input shaft for oscillating said spacer plate about said pinion shaft.

(References on following page)

References Cited in the file of this patent

UNITED STATES PATENTS

| | | |
|---|---|---|
| 1,000,406 | Heller | Aug. 15, 1911 |
| 1,409,864 | Jones | Mar. 14, 1922 |
| 1,761,308 | Morgan | June 30, 1930 |
| 1,804,055 | Herrmann | May 5, 1931 |
| 1,994,471 | Gregory | Mar. 19, 1935 |
| 2,079,197 | Bergman | May 4, 1937 |
| 2,451,688 | Myers et al. | Oct. 19, 1948 |
| 2,582,620 | Colucci | Jan. 15, 1952 |
| 2,810,298 | Thoresen | Oct. 22, 1957 |
| 2,896,464 | Renter et al. | July 28, 1959 |
| 2,959,062 | Looker | Nov. 8, 1960 |

FOREIGN PATENTS

| | | |
|---|---|---|
| 287,346 | Germany | Sept. 17, 1915 |

UNITED STATES PATENT OFFICE
CERTIFICATE OF CORRECTION

Patent No. 3,082,648 March 26, 1963

Stanley E. Toliver

It is hereby certified that error appears in the above numbered patent requiring correction and that the said Letters Patent should read as corrected below.

Column 2, line 2, after "housing" insert -- 10 --; column 4, line 13, for "end" read -- one --; column 5, line 13, for "of" read -- or --.

Signed and sealed this 8th day of October 1963.

(SEAL)
Attest:

ERNEST W. SWIDER
Attesting Officer

EDWIN L. REYNOLDS
Acting Commissioner of Patents